United States Patent
Ishimoto et al.

(10) Patent No.: US 10,331,226 B2
(45) Date of Patent: *Jun. 25, 2019

(54) REMOTELY OPERATING TARGET DEVICE

(71) Applicant: International Business Machines Corporation, Armonk, NY (US)

(72) Inventors: Kenya Ishimoto, Tokyo (JP); Hideo Takeda, Yamato (JP); Nobuyuki Yoshifuji, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/631,207

(22) Filed: Jun. 23, 2017

(65) Prior Publication Data
US 2018/0046262 A1 Feb. 15, 2018

Related U.S. Application Data

(63) Continuation of application No. 15/232,353, filed on Aug. 9, 2016.

(51) Int. Cl.
*G06F 3/03* (2006.01)
*G06K 9/00* (2006.01)
(Continued)

(52) U.S. Cl.
CPC .......... *G06F 3/0304* (2013.01); *G06F 3/002* (2013.01); *G06F 3/038* (2013.01); *G06F 3/0481* (2013.01);
(Continued)

(58) Field of Classification Search
CPC . G06F 3/0304; G06F 3/1462; G06K 9/00671; G06K 9/2081; G06K 2209/03; G06T 7/20
See application file for complete search history.

(56) References Cited

U.S. PATENT DOCUMENTS 6,463,343 B1 * 10/2002 Emens ................ G05B 19/042
382/115
2012/0320198 A1 * 12/2012 Yasutake ................ G06F 3/005
348/143

(Continued)

FOREIGN PATENT DOCUMENTS

WO 2006049506 A1 5/2006

OTHER PUBLICATIONS

"Android Remote PC"; updated Jan. 19, 2014; 2 pages; <http://www.androidremotepc.com/>.
(Continued)

*Primary Examiner* — Kenneth Bukowski
(74) *Attorney, Agent, or Firm* — Gilbert Harmon, Jr.

(57) ABSTRACT

The embodiments of the present invention provide systems and methods for remotely operating a target device. A camera image is obtained, including a target screen image (which is an image of a screen of the target device). The camera image is transmitted to and displayed in a second device. Operational information is obtained on the screen of the second device, which displays the camera image. The operational information is transmitted to a first device. Human device data, which derives from the operational information, is inputted from the first device to the target device.

7 Claims, 9 Drawing Sheets

(51) Int. Cl.
*G06K 9/20* (2006.01)
*G06F 3/14* (2006.01)
*G06F 3/00* (2006.01)
*G06F 3/038* (2013.01)
*G06F 3/0481* (2013.01)
*H04M 1/725* (2006.01)

(52) U.S. Cl.
CPC .......... *G06F 3/1454* (2013.01); *G06F 3/1462* (2013.01); *G06K 9/00671* (2013.01); *G06K 9/2081* (2013.01); *G06F 2203/0383* (2013.01); *G06F 2203/0384* (2013.01); *G06K 2209/03* (2013.01); *H04M 1/72533* (2013.01); *H04M 2250/52* (2013.01)

(56) References Cited

U.S. PATENT DOCUMENTS

| | | | |
|---|---|---|---|
| 2013/0046852 A1 | 2/2013 | Saxena et al. | |
| 2014/0133694 A1* | 5/2014 | Mishra | G08C 17/02 382/100 |
| 2014/0223323 A1* | 8/2014 | Kasahara | G06F 3/1423 715/740 |
| 2015/0128061 A1 | 5/2015 | Lesner | |
| 2015/0130838 A1* | 5/2015 | Kasahara | G06K 9/00671 345/633 |
| 2015/0180838 A1 | 6/2015 | Wu et al. | |
| 2016/0080466 A1 | 3/2016 | Kimura | |

OTHER PUBLICATIONS

"Android Remote PC Control"; JP INFOTECH; 2014-2015; 9 pages; <http://jpinfotech.org/wp-content/plugins/infotech/file/upload/pdf/3423JPA047---ANDROID-REMOTE-PC-CONTROL-pdf.pdf>.

"RealVNC"; Copyright © 2002-2016 RealVNC Limited; Printed Jul. 13, 2016; 3 pages; <https://www.realvnc.com/>.

"RealVNC | Products"; Copyright © 2002-2016 RealVNC Limited; Printed Jul. 13, 2016; 3 pages; <https://www.realvnc.com/products/vnc/>.

"Services"; Android Remote PC; Printed Jul. 13, 2016; 6 pages; <http://www.androidremotepc.com/services/>.

"WiFi Remote Control for your PC"; vectir; © 2015 Incendo Technology Ltd; Printed Mar. 26, 2016; 4 pages; <http://www.vectir.com/features/wifi-remote-control/>.

Ishimoto et al., "Remotely Operating Target Device", U.S. Appl. No. 15/232,353, filed Aug. 9, 2016, 37 pages.

Appendix P—List of IBM Patents or Patent Applications Treated as Related, Filed herewith, 2 Pages.

* cited by examiner

REMOTELY OPERATING TARGET DEVICE

BACKGROUND OF THE INVENTION

The present invention relates to the management of devices, and more specifically to remotely operating a target device.

There are techniques applied by end-users of one device in order to remotely operate a target device. When operating the target device remotely, there may be a need to address and troubleshoot technical difficulties on the target device from the end-user's remotely located device. Advanced preparation is required by these end-users, wherein the advanced preparation involves connecting a target device to the remotely located computer/device via a network. The network facilitates communication between the target device and the remotely located computer/device, which is in use by the end-user. Thus, end-users may be able to operate the target device.

SUMMARY

According to an embodiment of the present invention, a method for remotely operating a target device is provided. The method comprises: obtaining, by one or more processors, a camera image in a first device, wherein the camera image comprises a target screen image, wherein the target screen image is an image of a screen of the target device; transmitting, by one or more processors, at least a portion of the camera image from the first device to a second device, wherein the portion of the camera image includes at least the target screen image; displaying, by one or more processors, at least the portion of the camera image on a screen of the second device; obtaining, by one or more processors, operational information in the second device, wherein the operational information is indicative of an operation being performed on the screen of the second device; transmitting, by one or more processors, the operational information from the second device to the first device; and inputting, by one or more processors, human interface device data from the first device to the target device, wherein the human interface device data is based on the operational information.

According to another embodiment of the present invention, a computer program product for remotely operating a target device is provided based on the computer system implemented method above.

According to yet another embodiment of the present invention, a computer system for remotely operating a target device is provided based on the computer system implemented method above.

DETAILED DESCRIPTION

Conventional methods for operating a remote computer (i.e., accessing the remote computer from another device) include technologies such as remote desktop connection. With these technologies, permission is required to access the remote computer. Furthermore, complicated preparation steps, such as changing the firewall settings, may be required. In another example, a remote computer and a smartphone are connected to each other using these technologies over Bluetooth™. The end-user of the smartphone operates the remote computer by utilizing a user interface such as the touch pad user which is associated with the smartphone screen. However, often the screen of the remote computer cannot be viewed when using this type of technique. Embodiments of the present invention discloses systems and methods which permit the end-user to view the screen of the remote computer and operate the remote computer from another device, such a smartphone. These systems and methods of the invention enable the end-user to operate the remote computer safely using a smartphone without requiring complicated advanced preparation by the end-user.

Hereinafter, exemplary embodiments of the present invention will be described in detail with reference to the attached drawings. It is to be noted that the present invention is not limited to these exemplary embodiments to be given below and may be implemented with various modifications within the scope of the present invention. In addition, the drawings used herein are for purposes of illustration, and may not show actual dimensions.

Figure 1:
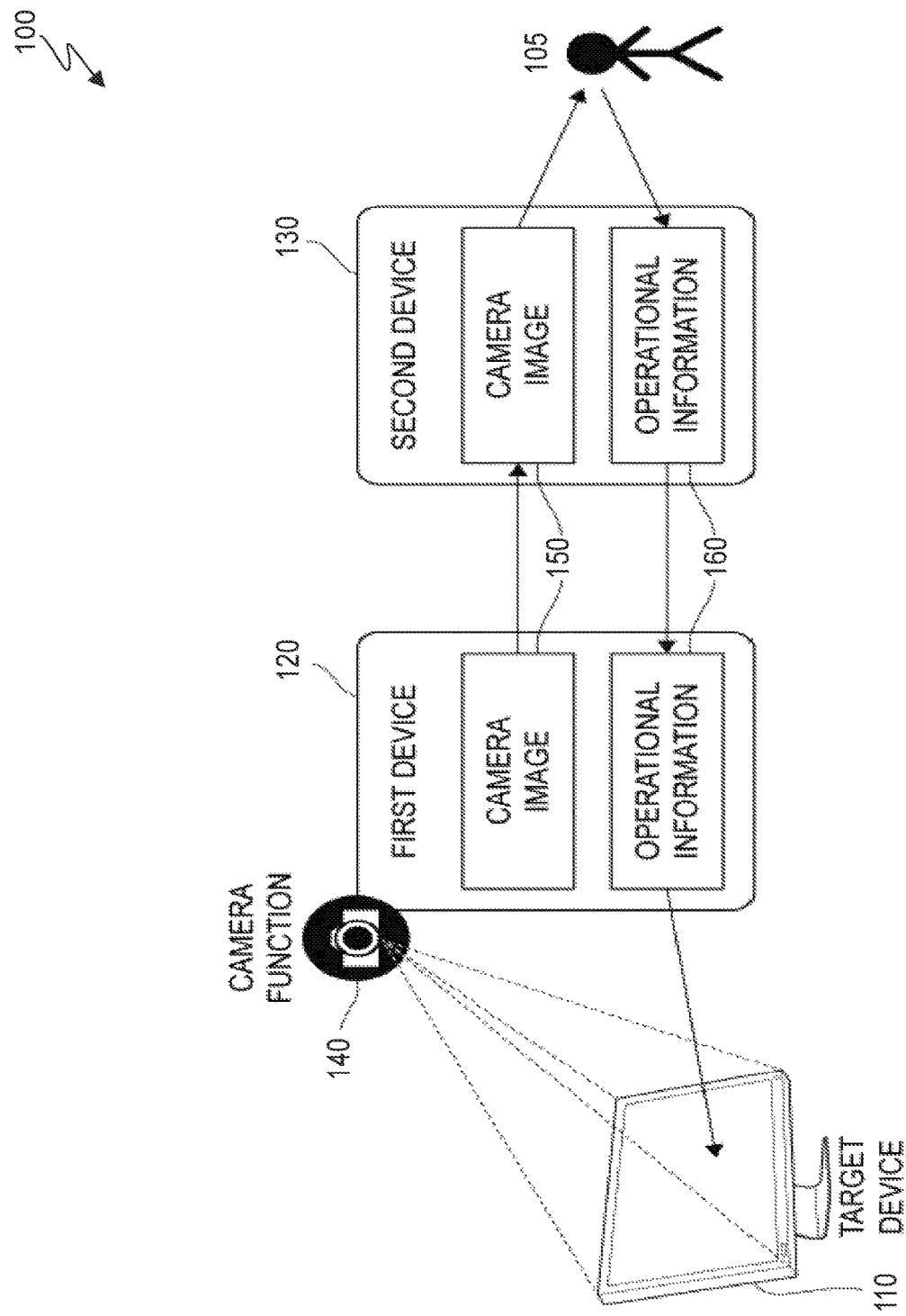
FIG. 1 is a functional block diagram which depicts the operation of a remote computing system, in accordance with an embodiment of the present invention.

FIG. 1 is a functional block diagram which depicts the operation of a remote computing system, in accordance with an embodiment of the present invention. Environment 100 contains the structures involved during the operation of the remote computing system which includes the following elements described below.

End-user 105 of target device 110 (e.g., a remote computer) captures visual elements which are contained within the display screen of target device 110. Camera function 140 is applied by first device 120 (e.g., a smartphone) in order to capture a screen shot deriving from target device 110. The screen shot contains at least some of the visual elements on the display screen of target device 110. First device 120 displays camera image 150, which includes an image of the screen shot deriving from target device 110, as captured by camera function 140. Herein, the image of the screen shot directly deriving from target device 110 is referred to as a "target screen image", which may not necessarily be the same exact image as camera image 150 as captured by camera function 140.

First device 120 may transmit at least a portion of camera image 150 to second device 130 (e.g., a processing terminal). Second device 130 acts as a processing terminal where end-user 105 performs operations, such as moving a pointer (e.g., a mouse cursor) or clicking an object (e.g., a button), while viewing camera image 150 as displayed on second device 130. More specifically, first device 120 contains camera image 150, which is subsequently transmitted to second device 130 at a remote location. Upon transmission of at least a portion of camera image 150, second device 130 displays camera image 150. Alternatively, in a case where the target screen image is transmitted from first device 120, second device 130 displays the target screen image and end-user 105 performs operations while viewing the target screen image as displayed second device 130.

In an exemplary embodiment, second device 130 captures the operations performed on camera image 150 as operational information 160, and sends operational information 160 to first device 120. Subsequently, first device 120 inputs a set of data which shows first device 120 as a human interface device (HID) into target device 110. Hereinafter, this set of data is referred to as "HID data". The HID data is based on/derived from operational information 160 sent from second device 130. For example, the HID data is the result of analyzing operational information 160, wherein the HID data is inputted into target device 110 by using Bluetooth™.

Figure 2A:
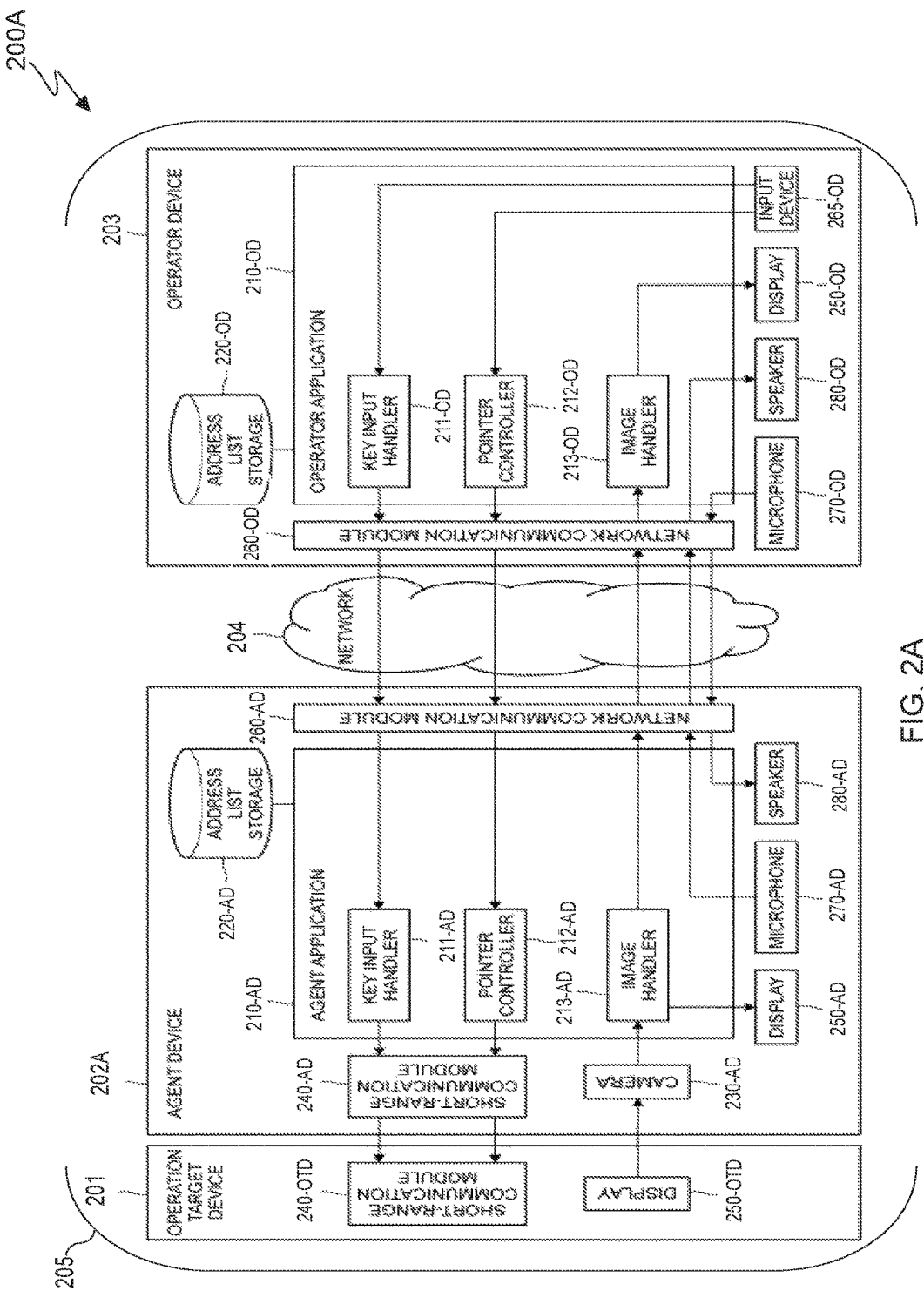
FIG. 2A is a block diagram of a first remote computing system, in accordance with an embodiment of the present invention.
Figure 2B:
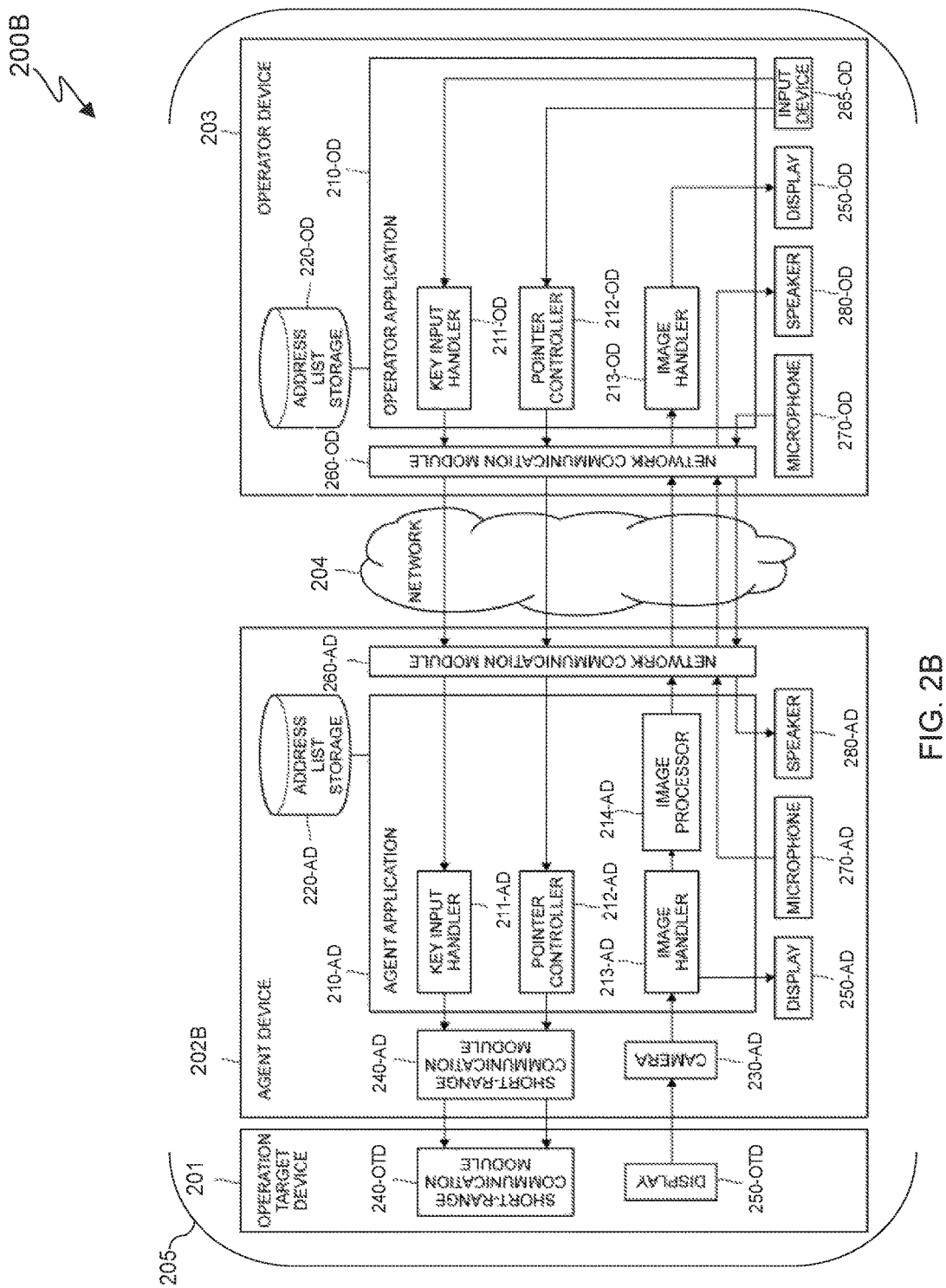
FIG. 2B is a block diagram of a second remote computing system, in accordance with an embodiment of the present invention.
Figure 2C:
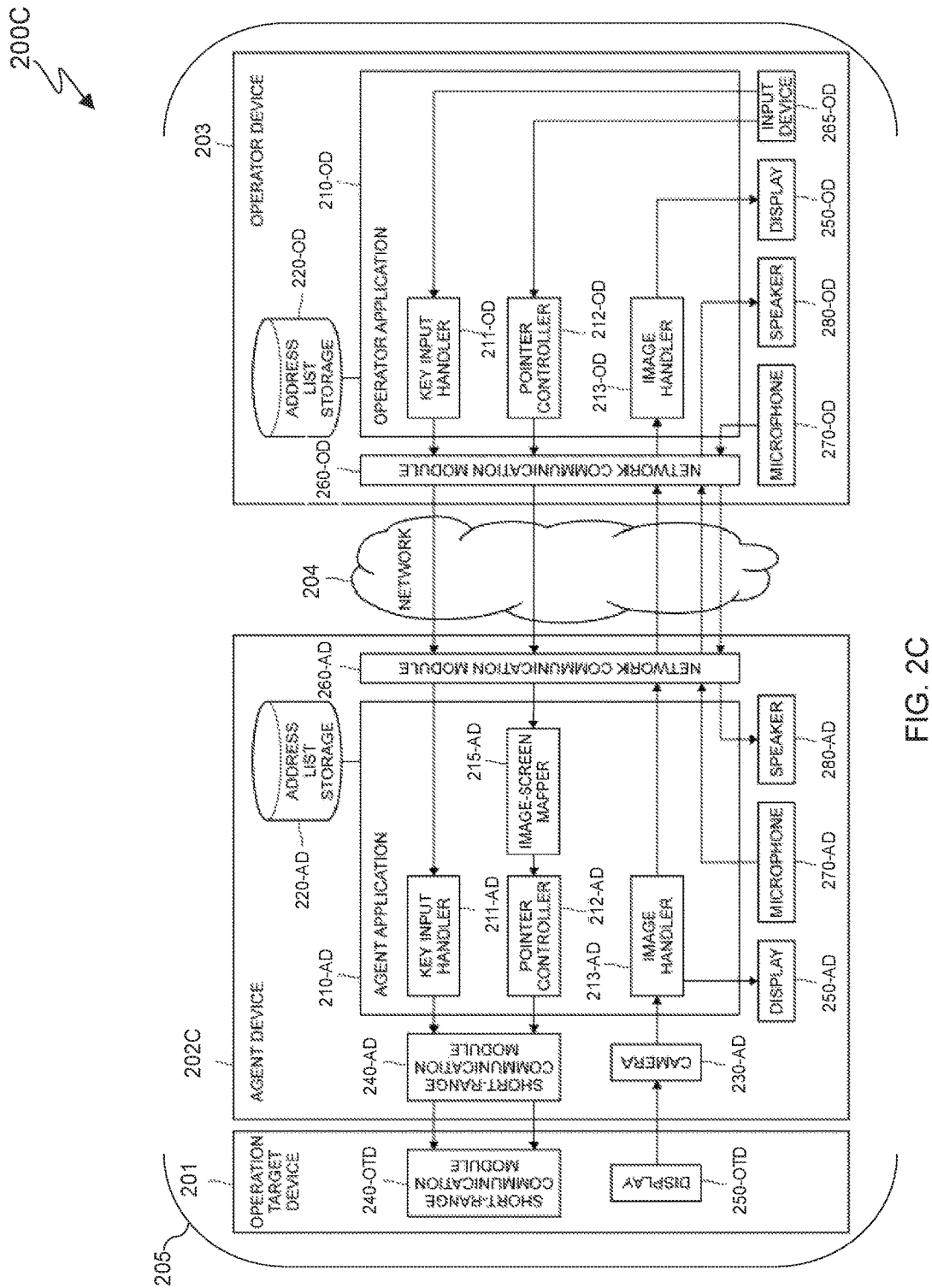
FIG. 2C is a block diagram of a third remote computing system, in accordance with an embodiment of the present invention.

FIG. 2A, FIG. 2B, and FIG. 2C are block diagrams illustrating a data processing environment, generally designated as data processing environments 200A, 200B, and 200C, respectively. FIG. 2A, FIG. 2B, and FIG. 2C provide only an illustration of implementation and does not imply any limitations with regard to the environments in which different embodiments may be implemented. Modifications to data processing environments 200A, 200B, and 200C may be made by those skilled in the art without departing from the scope of the invention as recited by the claims.

The actor of this invention is setup 205, which includes: (i) operation target device 201; (ii) a variation of agent device 202 (i.e., agent device 202A, agent device 202B, or agent device 202C); and (iii) operator device 203. Note: there are three variations of agent device 202—agent device 202A, agent device 202B, and agent device 202C. Operation target device 201; a variation of agent device 202 (i.e., agent device 202A, agent device 202B, or agent device 202C); and operator device 203 are components which are invoked by setup 205 to enable an end-user (such as end-user 105 in FIG. 1) to: (i) view a display screen of a remote computer; and (ii) operate the remote computer from another device, such a smartphone, without complicated advanced preparations by the end-user. Furthermore, the components of operation target device 201; a variation of agent device 202 (i.e., agent device 202A, agent device 202B, or agent device 202C); and operator device 203 are utilized by setup 205 to enable the operational steps performed in FIG. 3, FIG. 4, and FIG. 5.

Figure 4:
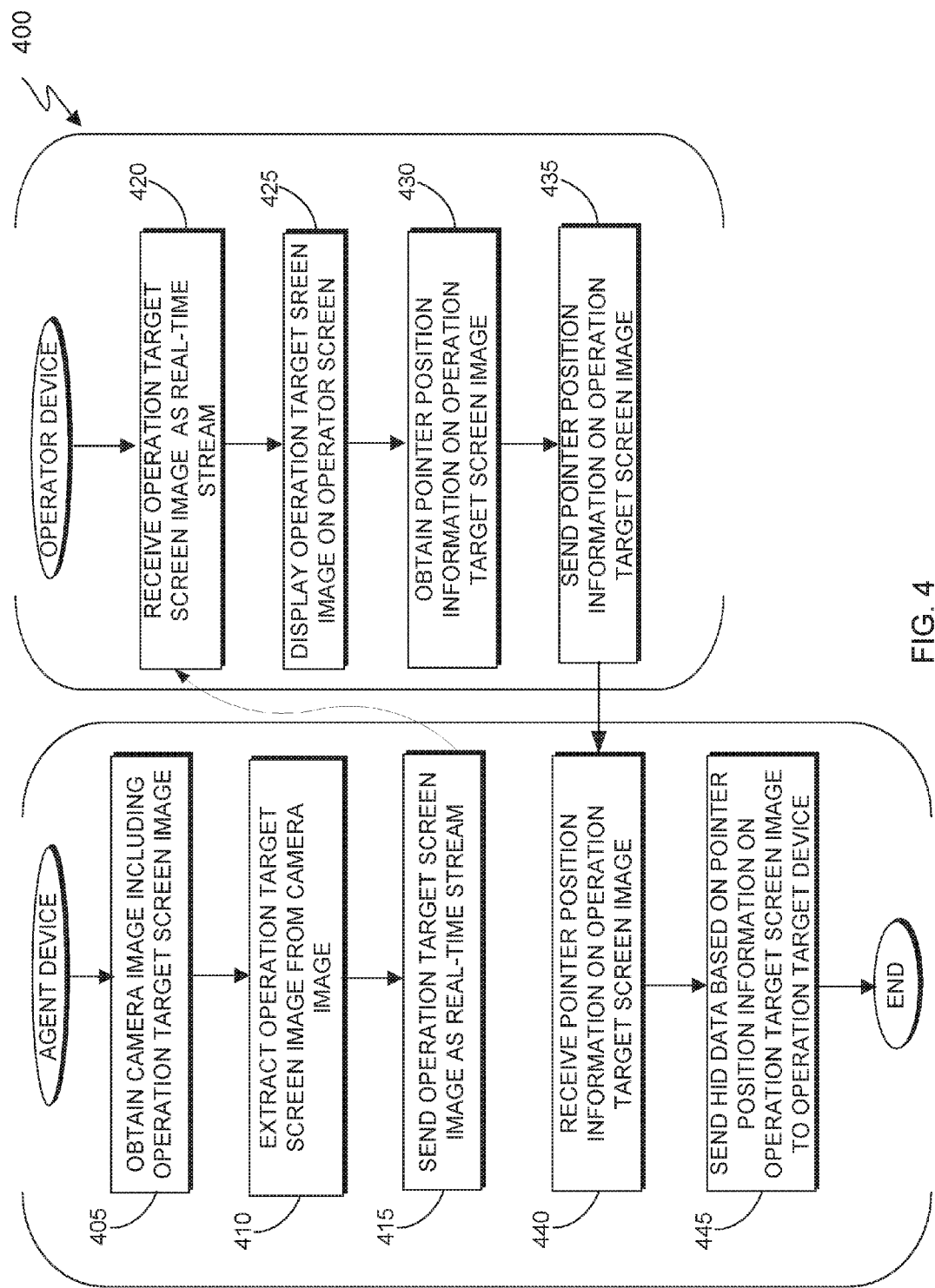
FIG. 4 is a second flowchart detailing the operation of the remote computing system, in accordance with an embodiment of the present invention.
Figure 5:
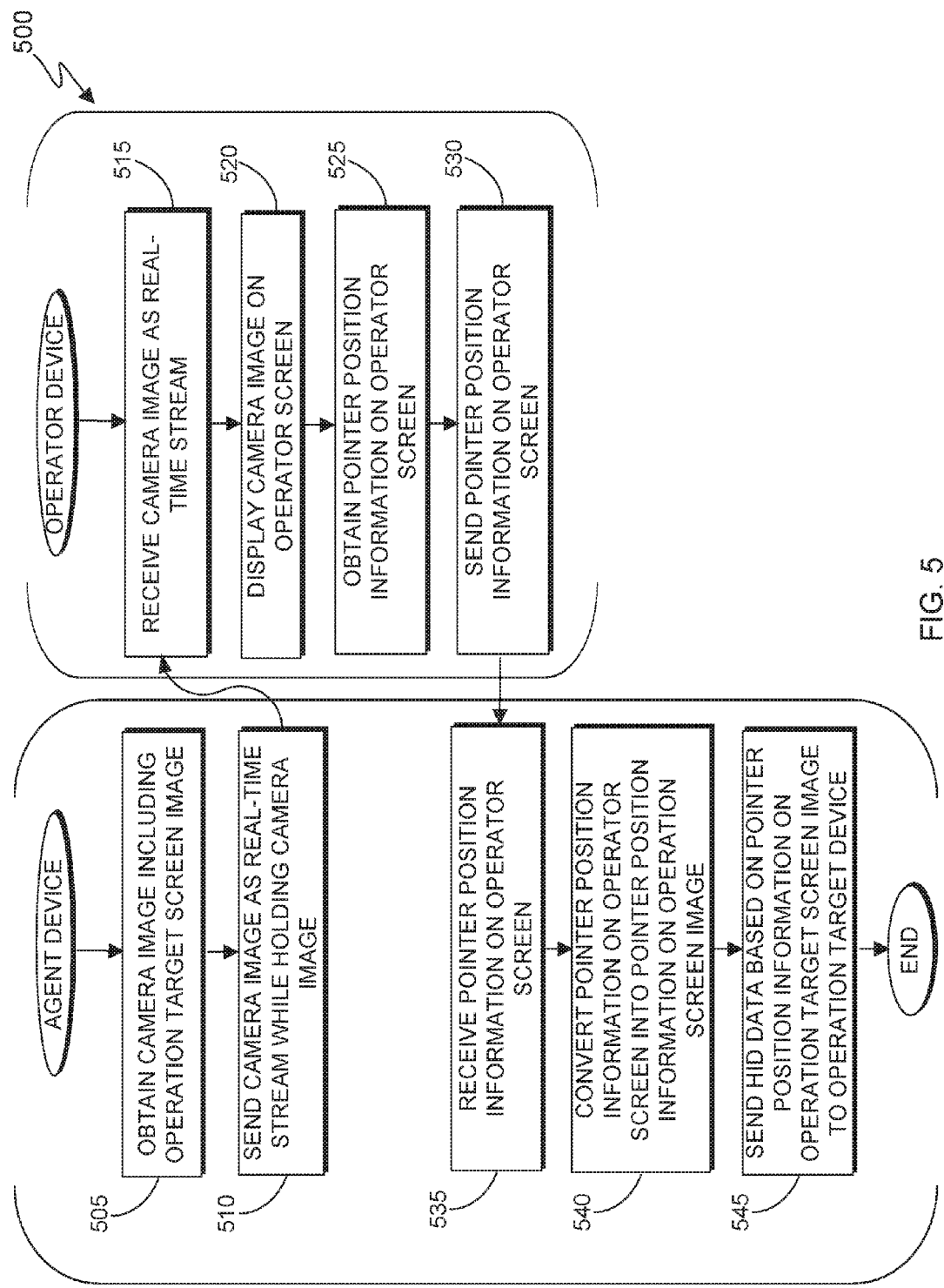
FIG. 5 is a third flowchart detailing the operation of the remote computing system, in accordance with an embodiment of the present invention.

In an exemplary embodiment depicted in FIG. 2A, agent application 210-AD, which resides in agent device 202A, contains: (i) key input handler 211-AD; (ii) pointer controller 212-AD; and (iii) image handler 213-AD. In another exemplary embodiment depicted in FIG. 2B, agent application 210-AD, which resides in agent device 202B, contains: (i) key input handler 211-AD; (ii) pointer controller 212-AD; (iii) image handler 213-AD; and (iv) image processor 214-AD. In yet another exemplary embodiment depicted in FIG. 2C, agent application 210-AD, which resides in agent device 202C, contains: (i) key input handler 211-AD; (ii) pointer controller 212-AD; (iii) image handler 213-AD; and (iv) image screen mapper 215-AD. The operational steps, performed by setup 205 in FIG. 3; FIG. 4; and FIG. 5, are associated with the data processing environment of setup 205 in FIG. 2A; FIG. 2B; and FIG. 2C, respectively.

FIG. 2A is a block diagram of a first remote computing system, in accordance with an embodiment of the present invention. In this exemplary embodiment, data processing environment 200A includes operation target device 201, agent device 202A, and operator device 203 connected by network 204.

The first remote computing system is depicted in FIG. 2A as setup 205, wherein setup 205 includes operation target device 201 serving as one example of target device 110 of FIG. 1; agent device 202A serving as one example of first device 120 of FIG. 1; operator device 203 serving as one example of second device 130 of FIG. 1; and network 204. Agent device 202A may also serve as one example of another apparatus or another computer for operator device 203, and operator device 203 may also serve as one example of another apparatus or another computer for agent device 202A. Note: hereinafter, an end-user of operation target device 201 and agent device 202A is referred to as "end-user A", and an end-user of operator device 203 is referred to as "end-user B."

Network 204 may be a local area network (LAN), a wide area network (WAN) such as the Internet, or a combination of the two, and can include wired, wireless, or fiber optic connections. In general, network 204 can be any combination of connections and protocols that will support communication between operation target device 201, agent device 202A, and operator device 203.

Operation target device 201 may be a computer device which is a target of the remote operation. For example, a personal computer may be used as operation target device 201. Operation target device 201 includes display 250-OTD and short-range communication module 240-OTD. For example, display 250-OTD is a device for displaying, on the display screen contained within display 250-OTD, a result of a process performed in operation target device 201. For example, short-range communication module 240-OTD is a device for receiving HID data from agent device 202A. Operation target device 201 may include internal and external hardware components, as depicted and described in further detail with respect to FIG. 7.

Agent device 202A may be a computer device acting as an input device, such as a keyboard, a mouse, or the like. This is achieved by registering agent device 202A as an HID conforming to a predetermined standard such as Bluetooth™, a Universal Serial Bus (USB), or the like. For example, a smartphone or a tablet may be used as agent device 202A. Agent device 202A includes the following components: agent application 210-AD, address list storage 220-AD, camera 230-AD, and network communication module 260-AD. Furthermore, agent device 202A may include the following components: display 250-AD, short-range communication module 240-AD, microphone 270-AD, and speaker 280-AD.

In the first remote computing system, agent application 210-AD is an application used to perform remote operation of operation target device 201. Agent application 210-AD may be originally absent in agent device 202A, and installed in agent device 202A afterwards. Agent application 210-AD further includes key input handler 211-AD, pointer controller 212-AD, and image handler 213-AD. Key input handler 211-AD receives key input information which are indicative of key inputs as performed by user B (i.e., operational information 160 from FIG. 1) from network communication module 260-AD, and sends the key input information to short-range communication module 240-AD. Pointer controller 212-AD may receive pointer information indicating a pointer arranged by user B from network communication module 260-AD; and send the pointer information to short-range communication module 240-AD. In an exemplary embodiment, pointer controller 212-AD mainly receives pointer movement information, which is indicative of a movement direction and an amount of movement by the pointer, from network communication module 260-AD; and sends the pointer movement information to short-range communication module 240-AD. Image handler 213-AD receives a camera image from camera 230-AD; and sends the camera image to display 250-AD and network communication module 260-AD.

Address list storage 220-AD is a device for storing an address list. The address list may include the addresses of a plurality of operator devices to which agent device 202A may connect to for the remote operation of operation target device 201. Camera 230-AD may be a device for taking a camera image including an image of a screen of operation target device 201. Hereinafter, the image of the screen of operation target device 201 is referred to as an "operation target screen image." The camera image is assumed to include an image outside of the operation target screen image. Network communication module 260-AD is a module for performing communications with other devices via network 204. A communication application program interface (API) may be used as network communication module 260-AD.

Display 250-AD is a device for displaying on the display screen of display 250-AD the camera image taken by camera 230-AD. Short-range communication module 240-AD is a module for performing communication over a short-range communication protocol such as Bluetooth™, a Universal Serial Bus (USB), or the like. Microphone 270-AD is a device for acquiring the voice of end-user A and converting the voice into an electrical signal which represents the voice. Speaker 280-AD is a device for converting an electrical signal, which represents the voice of end-user B, into a corresponding sound.

Operator device 203 is a computing device which is utilized for the remote operation of operation target device 201. For example, a smartphone, a tablet, or a PC is utilized as operator device 203 by end-user B. Operator device 203 includes the following components: operator application 210-OD; address list storage 220-OD, and network communication module 260-OD. Furthermore, operator device 203 may include: display 250-OD; input device 265-OD; microphone 270-OD; and speaker 280-OD.

Operator application 210-OD is an application used to perform the remote operation of operation target device 201. Operator application 210-OD may be originally absent in operator device 203, and installed in operator device 203 afterwards. Operator application 210-OD further includes: key input handler 211-OD; pointer controller 212-OD; and image handler 213-OD. Key input handler 211-OD receives the key input information, which is indicative of the key inputs performed by end-user B, from input device 265-OD; and sends the key input information to network communication module 260-OD. Pointer controller 212-OD receives the pointer information, which is indicative of a pointer arranged by end-user B, from input device 265-OD; and sends the pointer information to network communication module 260-OD. In an exemplary embodiment, pointer controller 212-OD mainly receives the pointer movement information, which is indicative of a movement direction of the pointer and an amount of movement by the pointer, from input device 265-OD; and mainly sends the pointer movement information to network communication module 260-OD. Image handler 213-OD receives the camera image from network communication module 260-OD; and sends the camera image (i.e., camera image 150) to display 250-OD.

Address list storage 220-OD is a device for storing an address list. The address list may include the addresses of plural agent devices to which operator device 203 may connect to for remote operation of operation target device 201. Network communication module 260-OD is a module for performing communications with other devices via network 204. A communication API may be used as network communication module 260-OD.

Display 250-OD is a device for displaying, on the display screen of display 250-OD, the camera image (i.e., camera image 150) sent from operator application 210-OD. Hereinafter, the display screen of operator device 203 is referred to as an "operator screen". Input device 265-OD may be a device for performing key inputs and arranging a pointer. In one embodiment, operator device 203 is a smartphone or a tablet; a keyboard externally attached to operator device 203; and a touch screen of operator device 203 which is used as input device 265-OD. In another embodiment, operator device 203 is a personal computer; a keyboard; and a mouse connected to operator device 203 which is used as input device 265-OD. Microphone 270-AD is a device for acquiring the voice of end-user B and converting the voice into an electrical signal which represents the voice. Speaker 280-AD is a device for converting an electrical signal, which represents the voice of end-user A, into a corresponding sound.

FIG. 2B is a block diagram of a second remote computing system, in accordance with an embodiment of the present invention. In this exemplary embodiment, data processing environment 200B includes operation target device 201, agent device 202B, and operator device 203 connected by network 204.

The second remote computing system is depicted in FIG. 2B as setup 205, wherein setup 205 includes operation target device 201 serving as one example of target device 110 of FIG. 1; agent device 202B serving as one example of first device 120 of FIG. 1; operator device 203 serving as one example of second device 130 of FIG. 1, and network 204. Agent device 202B may also serve as one example of another apparatus or another computer for operator device 203, and operator device 203 may also serve as one example of another apparatus or another computer for agent device 202B. Note: hereinafter, an end-user of operation target device 201 and agent device 202B is referred to as "end-user A", and an end-user of operator device 203 is referred to as "end-user B."

Operation target device 201 may be a computer device which is a target of the remote operation. For example, a personal computer may be used as operation target device 201. Operation target device 201 includes display 250-OTD and a short-range communication module 240-OTD. For example, display 250-OTD is a device for displaying, on the display screen contained within display 250-OTD, a result of a process performed in operation target device 201. For example, short-range communication module 240-OTD is a device for receiving HID data from agent device 202B. Display 250-OTD and short-range communication module 240-OTD in the second remote computing system may be the same as those in the first remote computing system. Operation target device 201 may include internal and external hardware components, as depicted and described in further detail with respect to FIG. 7.

Agent device 202B may be a computer device acting as an input device, such as a keyboard, a mouse, or the like. This is achieved by registering agent device 202 as an HID conforming to a predetermined standard such as Bluetooth™, a Universal Serial Bus (USB), or the like. For example, a smartphone or a tablet may be used as agent device 202B. Agent device 202B includes the following components: agent application 210-AD, address list storage 220-AD, camera 230-AD, and network communication module 260-AD. Furthermore, agent device 202B may include the following components: display 250-AD, short-range communication module 240-AD, microphone 270-AD, and speaker 280-AD.

In the second remote computing system, agent application 210-AD is an application used to perform remote operation of operation target device 201. In the second remote computing system, agent application 210-AD includes key input handler 211-AD, pointer controller 212-AD, and image handler 213-AD as in the first remote computing system. Furthermore, in the second remote computing system, agent application 210-AD includes image processor 214-AD (which is not present in the first remote computing system). Key input handler 211-AD in the second remote computing system may be the same as that in the first remote computing system. Pointer controller 212-AD in the second remote computing system may be the same as that in the first remote computing system, except that pointer controller 212-AD in the second remote computing system mainly receives and sends the pointer position information, which is indicative of a position of the pointer on the operation target screen image, instead of the pointer movement information. Image handler 213-AD in the second remote computing system may be the same as that in the first remote computing system, except that image handler 213-AD in the second remote computing system sends the camera image to image processor 214-AD instead of network communication module 260-OD. Image processor 214-AD receives the camera image from image handler 213-AD, extracts the operation target screen image from the camera image, and sends the operation target screen image to network communication module 260-OD.

Address list storage 220-AD, camera 230-AD, network communication module 260-OD, display 250-AD, short-range communication module 240-AD, microphone 270-AD, and speaker 280-AD in the second remote computing system may be the same as those in the first remote computing system.

Operator device 203 is a computing device which is utilized for the remote operation of operation target device 201. For example, a smartphone, a tablet, or a PC is utilized as operator device 203 by end-user B. Operator device 203 includes the following components: operator application 210-OD; address list storage 220-OD, and network communication module 260-OD. Furthermore, operator device 203 may include: display 250-OD; input device 265-OD; microphone 270-OD; and speaker 280-OD.

Operator application 210-OD is an application used to perform the remote operation of operation target device 201. Operator application 210-OD may be originally absent in operator device 203, and installed in operator device 203 afterwards. Operator application 210-OD further includes: key input handler 211-OD; pointer controller 212-OD; and image handler 213-OD. Key input handler 211-OD receives the key input information, which is indicative of the key inputs performed by end-user B, from input device 265-OD; and sends the key input information to network communication module 260-OD. Pointer controller 212-OD in the second remote computing system may be the same as that in the first remote computing system, except that pointer controller 212-OD in the second remote computing system mainly receives and sends the pointer position information, which is indicative of a position of the pointer on the operation target screen image, instead of the pointer movement information. Image handler 213-OD in the second remote computing system may be the same as that in the first remote computing system, except that image handler 213-OD receives and sends the operation target screen image instead of the camera image. Note: operator application 210-OD, instead of agent application 210-AD, may include an image processor. In this instance, the image processor may be arranged on the side of network communication module 260-OD with respect to image handler 213-OD.

Address list storage 220-OD is a device for storing an address list. The address list may include the addresses of plural agent devices to which operator device 203 may connect to for remote operation of operation target device 201. Network communication module 260-OD is a module for performing communications with other devices via network 204. A communication API may be used as network communication module 260-OD.

Address list storage 220-OD and network communication module 260-OD in the second remote computing system may be the same as those in the first remote computing system. Display 250-OD in the second remote computing system may be the same as that in the first remote computing system, except that display 250-OD displays the operation target screen image instead of the camera image. Input device 265-OD, microphone 270-OD, and speaker 280-OD in the second remote computing system may be the same as those in the first remote computing system.

FIG. 2C is a block diagram of a third remote computing system, in accordance with an embodiment of the present invention. In this exemplary embodiment, data processing environment 200C includes operation target device 201, agent device 202C, and operator device 203 connected by network 204.

The third remote computing system is depicted in FIG. 2C as setup 205, wherein setup 205 includes operation target device 201 serving as one example of target device 110 of FIG. 1; agent device 202C serving as one example of first device 120 of FIG. 1; operator device 203 serving as one example of second device 130 of FIG. 1, and network 204. Agent device 202C may also serve as one example of another apparatus or another computer for operator device 203, and operator device 203 may also serve as one example of another apparatus or another computer for agent device 202C. Note: hereinafter, an end-user of operation target device 201 and agent device 202C is referred to as "end-user A", and an end-user of operator device 203 is referred to as "end-user B."

Operation target device 201 may be a computer device which is a target of the remote operation. For example, a personal computer may be used as operation target device 201. Operation target device 201 includes display 250-OTD and short-range communication module 240-OTD. For example, display 250-OTD is a device for displaying, on the display screen contained within display 250-OTD, a result of a process performed in operation target device 201. For example, short-range communication module 240-AD is a device for receiving HID data from agent device 202C. Display 250-OTD and short-range communication module 240-OTD in the third remote computing system may be the same as those in the first remote computing system. Operation target device 201 may include internal and external hardware components, as depicted and described in further detail with respect to FIG. 7.

Agent device 202C may be a computer device acting as an input device, such as a keyboard, a mouse, or the like. This is achieved by registering agent device 202 as an HID conforming to a predetermined standard such as Bluetooth™, a Universal Serial Bus (USB), or the like. For example, a smartphone or a tablet may be used as agent device 202C. Agent device 202C includes the following components: agent application 210-AD, address list storage 220-AD, camera 230-AD, and network communication module 260-AD. Furthermore, agent device 202C may include the following components: display 250-AD, short-range communication module 240-AD, microphone 270-AD, and speaker 280-AD.

In the third remote computing system, agent application 210-AD is an application used to perform remote operation of operation target device 201. In the third remote computing system, agent application 210-AD includes key input handler 211-AD, pointer controller 212-AD, and image handler 213-AD as in the first remote computing system. Furthermore, in the third remote computing system, agent application 210-AD includes image-screen mapper 215-AD (which is not present in the first remote computing system). Key input handler 211-AD in the third remote computing system may be the same as that in the first remote computing system. Pointer controller 212-AD in the third remote computing system may be the same as that in the first remote computing system, except that: (i) pointer controller 212-AD in the third remote computing system mainly receives and sends the pointer position information, which is indicative of a position of the pointer on the operation target screen image, instead of the pointer movement information; and (ii) pointer controller 212-AD in the third remote computing system receives information from image-screen mapper 215-AD instead of network communication module 260-AD. Image handler 213-AD in the third remote computing system may be the same as that in the first remote computing system, except that image handler 213-AD in the third remote computing systems sends the camera image to image-screen mapper 215-AD and network communication module 260-AD instead of sending the camera image only to network communication module 260-AD. Image-screen mapper 215-AD maps a position on the operation target screen image to a position on an operator screen. More specifically, image-screen mapper 215-AD receives one set of pointer position information, which is indicative of a position of the pointer on the operator screen; converts the pointer position information, which is indicative of the position of the pointer on the operator screen, into a set of pointer position information, which is indicative of the position of a pointer on the operation target screen image; and sends the converted pointer position information to pointer controller 212-AD. Furthermore, image-screen mapper 215-AD performs a fine adjustment of the pointer position information, which is sent to pointer controller 212-AD, by comparing the position, as indicated by the pointer position information, and a position of a pointer on the camera image sent from image handler 213-AD.

In the third remote computing system, setup 205 applies image-screen mapper 215-AD in order to perform the following functions: (i) processing the camera image in terms of coordinates in operator device 203 upon an end-user physically tapping on the location of the camera image, which provides pointer position information; (ii) calculating coordinates in the screen of operation target device 201 upon processing the screen area in the camera image; and (iii) updating the camera image in the display screen of operation target device 201 upon recognizing pointer position information in the camera image and adjusting the pointer position information.

Address list storage 220-AD, camera 230-AD, network communication module 260-OD, display 250-AD, short-range communication module 240-AD, microphone 270-AD, and speaker 280-AD in the third remote computing system may be the same as those in the first remote computing system.

Operator device 203 is a computing device which is utilized for the remote operation of operation target device 201. For example, a smartphone, a tablet, or a PC is utilized as operator device 203 by end-user B. Operator device 203 includes the following components: operator application 210-OD; address list storage 220-OD, and network communication module 260-OD. Furthermore, operator device 203 may include: display 250-OD; input device 265-OD; microphone 270-OD; and speaker 280-OD.

Operator application 210-OD is an application used to perform the remote operation of operation target device 201. Operator application 210-OD may be originally absent in operator device 203, and installed in operator device 203 afterwards. Operator application 210-OD further includes: key input handler 211-OD; pointer controller 212-OD; and image handler 213-OD. Key input handler 211-OD receives the key input information, which is indicative of the key inputs performed by end-user B, from input device 265-OD; and sends the key input information to network communication module 260-OD. Pointer controller 212-OD in the third remote computing system may be the same as that in the first remote computing system, except that pointer controller 212-OD in the third remote computing system mainly receives and sends the pointer position information, which is indicative of a position of the pointer on the operation target screen image, instead of the pointer movement information. Image handler 213-OD in the third remote computing system may be the same as that in the first remote computing system. Note: operator application 210-OD instead of agent application 210-AD may include image-screen mapper 215-AD. In this instance, the image processor may be arranged on the side of network communication module 260-OD with respect to point controller 212-OD Address list storage 220-OD is a device for storing an address list. The address list may include the addresses of plural agent devices to which operator device 203 may connect to for remote operation of operation target device 201. Network communication module 260-OD is a module for performing communications with other devices via network 204. A communication API may be used as network communication module 260-OD.

Address list storage 220-OD, network communication module 260-OD, display 250-OD, input device 265-OD, microphone 270-OD, and speaker 280-OD in the third remote computing system may be the same as those in the first remote computing system.

Figure 3:
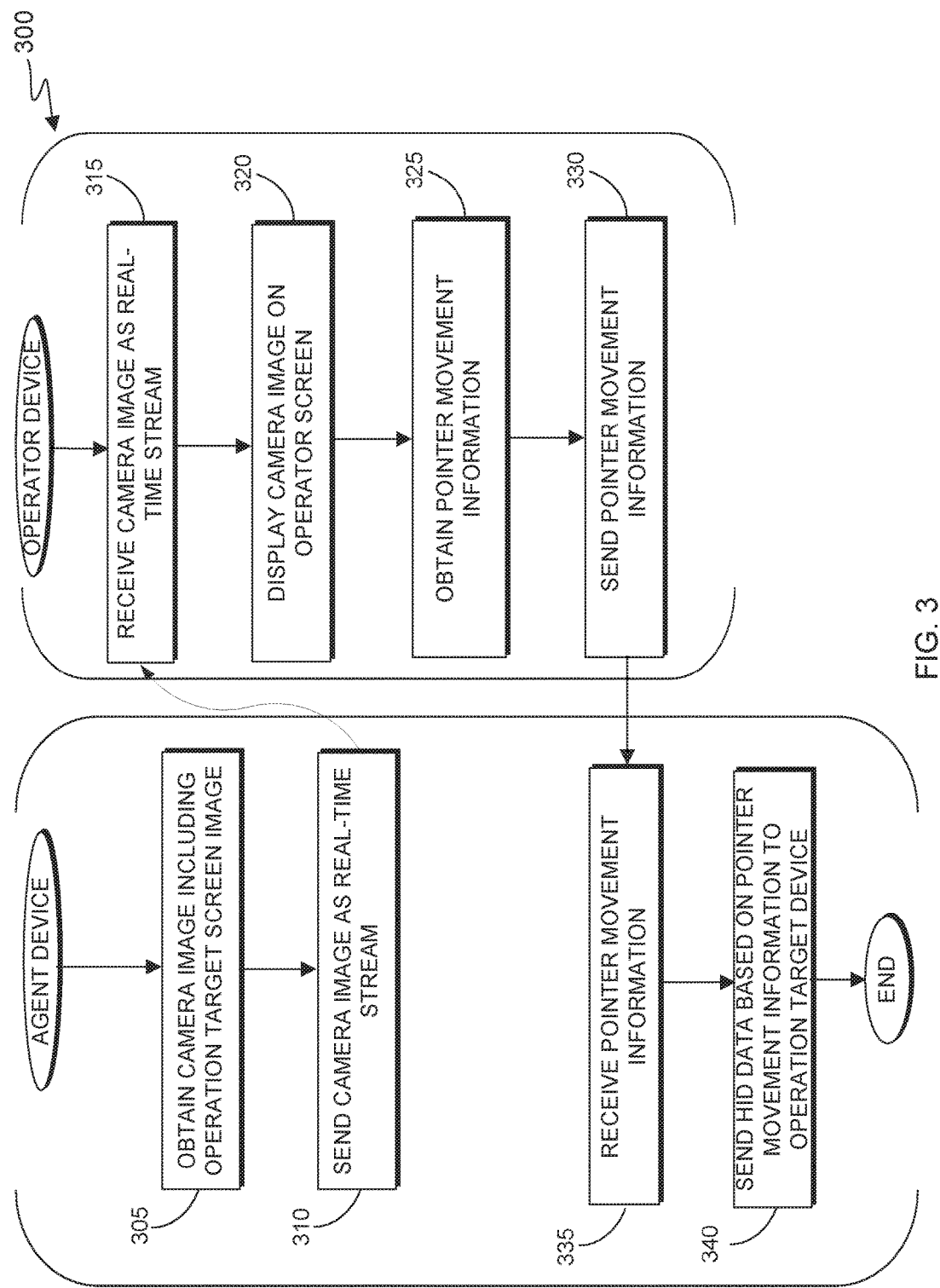
FIG. 3 is a first flowchart detailing the operation of the remote computing system, in accordance with an embodiment of the present invention.

FIG. 3 is a first flowchart detailing the operation of the first remote computing system, in accordance with an embodiment of the present invention.

In an exemplary embodiment, the following sequence is performed in conjunction with the steps described in flowchart 300: (i) end-user A installs agent application 210-AD in agent device 202A, and end-user B installs operator application 210-OD in operator device 203; (ii) end-user A opens agent application 210-AD on agent device 202A, and connects agent device 202A as an input device to operation target device 201 over a short-range communication protocol; (iii) end-user A communicates with operator device 203 using agent application 210-AD; (iv) operator device 203, which is in use by end-user B, receives the communication from end-user A and initiates operator application 210-OD; and (v) a camera image (including an operation target screen image) is captured on agent device 202 by using camera 230-AD. Setup 205 performs the steps of the flow chart on an agent device (which is reminiscent of agent device 202A) and on an operator device (which is reminiscent of operator device 203). Steps 305, 310, 335, and 340 are performed on agent device 202A. Steps 315, 320, 325, and 330 are performed on operator device 203.

In step 305, setup 205 invokes image handler 213-AD of agent device 202A, wherein image handler 213-AD obtains a camera image, including the operation target screen image.

In step 310, setup 205 invokes image handler 213-AD of agent device 202A, wherein image handler 213-AD sends the camera image as a real-time stream to operator device 203. The camera image sent to operator device 203 is from step 305.

In step 315, setup 205 invokes image handler 213-OD of operator device 203, wherein image handler 213-OD receives the camera image as a real-time stream. The camera image received by operator device 203 is from agent device 202A.

In step 320, setup 205 invokes image handler 213-OD of operator device 203, wherein image handler 213-OD displays the camera image on the operator screen. The operator screen may be display 250-OD. When the camera image is displayed, end-user B may perform operations such as moving a pointer or clicking an object on the operator screen while viewing the camera image on operator application 210-OD of operator device 203.

In step 325, setup 205 invokes pointer controller 212-OD of operator device 203, wherein pointer controller 212-OD obtains pointer movement information. More specifically, pointer controller 212-OD creates the pointer movement information based on a movement direction and a movement amount of the pointer (i.e., the operations performed in step 320). Pointer controller 212-OD may create additional operational information based on the types of the clicks. Alternatively, key input handler 211-OD may create another set of operational information based on characters designated by key inputs.

In step 330, setup 205 invokes pointer controller 212-OD of operator device 203, wherein pointer controller 212-OD sends the pointer movement information to agent device 202. The pointer movement information (i.e., the data to be sent to agent device 202A) is obtained in step 325.

In step 335, setup 205 invokes pointer controller 212-AD of agent device 202A, wherein pointer controller 212-AD receives the pointer movement information from operator device 203. The pointer movement information (i.e., the data received by agent device 202A) is obtained in step 325.

In step 340, setup 205 invokes pointer controller 212-AD of agent device 202A, wherein pointer controller 212-AD sends the HID data based on the pointer movement information to operation target device 201. The HID data is created by analyzing the pointer movement information. Consequently, operations such as moving a pointer, clicking an object, or the like are performed on the screen (i.e., display 250-OTD) of operation target device 201.

FIG. 4 is a second flowchart detailing the operation of the second remote computing system, in accordance with an embodiment of the present invention.

In an exemplary embodiment, the following sequence is performed in conjunction with the steps described in flowchart 400: (i) end-user A installs agent application 210-AD in agent device 202B, and end-user B installs operator application 210-OD in operator device 203; (ii) end-user A opens agent application 210-AD on agent device 202B, and connects agent device 202B as an input device to operation target device 201 over a short-range communication protocol; (iii) end-user A communicates with operator device 203 using agent application 210-AD; (iv) operator device 203, which is in use by end-user B, receives the communication from end-user A and initiates operator application 210-OD; and (v) a camera image (including an operation target screen image) is captured on agent device 202B by using camera 230-AD. Setup 205 performs the steps of the flow chart on an agent device (which is reminiscent of agent device 202B) and on an operator device (which is reminiscent of operator device 203). Steps 405, 410, 415, 440, and 445 are performed on agent device 202B. Steps 420, 425, 430, and 435 are performed on operator device 203.

In step 405, setup 205 invokes image handler 213-AD of agent device 202B, wherein image handler 213-AD obtains a camera image, including the operation target screen image.

In step 410, setup 205 invokes image processor 214 of agent device 202B, wherein image processor 214 extracts the operation target screen image from the camera image. The operation target screen may be contained within the camera image.

In step 415, setup 205 invokes image handler 213-AD of agent device 202B, wherein image handler 213-AD sends the operation target screen image as a real-time stream to operator device 203. The operation target screen image sent to operator device 203 is from step 410.

In step 420, setup 205 invokes image handler 213-OD of operator device 203, wherein image handler 213-OD receives the operation target screen image as a real-time stream. The camera image received by operator device 203 is from agent device 202B.

In step 425, setup 205 invokes image handler 213-OD of operator device 203, wherein image handler 213-OD displays the target screen image on the operator screen. The operator screen may be display 250-OD. When the target screen image is displayed, end-user B may perform operations such as moving a pointer or clicking an object on the operator screen while viewing the target screen image on operator application 210-OD of operator device 203.

In step 430, setup 205 invokes pointer controller 212-OD of operator device 203, wherein pointer controller 212-OD obtains pointer position information. More specifically, pointer controller 212-OD creates the pointer position information based on a position of the pointer on the operation target screen image (i.e., the operations performed in step 425). Pointer controller 212-OD may create additional operational information based on the type of clicks (on objects). Alternatively, key input handler 211-OD may create another set of operational information based on characters designated by key inputs.

In step 435, setup 205 invokes pointer controller 212-OD of operator device 203, wherein pointer controller 212-OD sends the pointer position information to agent device 202B. The pointer position information (i.e., the data to be sent to agent device 202B) is obtained in step 430.

In step 440, setup 205 invokes pointer controller 212-AD of agent device 202B, wherein pointer controller 212-AD receives the pointer position information on the operation target screen image. The pointer position information (i.e., the data received by agent device 202B) is obtained in step 430.

In step 445, setup 205 invokes pointer controller 212-AD of agent device 202B, wherein pointer controller 212-AD sends the HID data based on the pointer position information on the operation target screen image to operation target device 201. The HID data is created by analyzing the pointer position information on the operation target screen image. Consequently, operations, such as moving a pointer, clicking an object, or the like, are performed on the screen (i.e., display 250-OTD) of operation target device 201.

FIG. 5 is a third flowchart detailing the operation of the third remote computing system, in accordance with an embodiment of the present invention.

In an exemplary embodiment, the following sequence is performed prior to the steps in conjunction with the steps described in flowchart 500: (i) end-user A installs agent application 210-AD in agent device 202B, and end-user B installs operator application 210-OD in operator device 203; (ii) end-user A opens agent application 210-AD on agent device 202C, and connects agent device 202B as an input device to operation target device 201 over a short-range communication protocol; (iii) end-user A communicates with operator device 203 using agent application 210-AD; (iv) operator device 203, which is in use by end-user B, receives the communication from end-user A and initiates operator application 210-OD; and (v) a camera image (including an operation target screen image) is captured on agent device 202C by using camera 230-AD. Setup 205 performs the steps of the flow chart on an agent device (which is reminiscent of agent device 202C) and on an operator device (which is reminiscent of operator device 203). Steps 505, 510, 535, 540, and 545 are performed on agent device 202C. Steps 515, 520, 525, and 530 are performed on operator device 203.

In step 505, setup 205 invokes image handler 213-AD of agent device 202C, wherein image handler 213-AD obtains a camera image, including the operation target screen image.

In step 510, setup 205 invokes image handler 213-AD of agent device 202C, wherein image handler 213-AD sends the camera image as a real-time stream while holding the camera image. More specifically, image handler 213-AD sends the camera image to image-screen mapper 215-AD on agent device 202C and to operator device 203.

In step 515, setup 205 invokes image handler 213-OD of operator device 203, wherein image handler 213-OD receives the camera image as a real-time stream. The camera image received by operator device 203 is from agent device 202C.

In step 520, setup 205 invokes image handler 213-OD of operator device 203, wherein image handler 213-OD displays the camera image on the operator screen. The operator screen may be display 250-OD. When the camera image is displayed, end-user B may perform operations such as moving a pointer or clicking an object on the operator screen while viewing the camera image on operator application 210-OD of operator device 203.

In step 525, setup 205 invokes pointer controller 212-OD of operator device 203, wherein pointer controller 212-OD obtains pointer movement information. More specifically, pointer controller 212-OD creates the pointer movement information based on a movement direction of the pointer and an amount of movement by the pointer (i.e., the operations performed in step 520). Pointer controller 212-OD may create additional operational information based on the types of the clicks. Alternatively, key input handler 211-OD may create another set of operational information based on characters designated by key inputs.

In step 530, setup 205 invokes pointer controller 212-OD of operator device 203, wherein pointer controller 212-OD sends the pointer movement information to agent device 202C. The pointer movement information (i.e., the data sent to agent device 202C) is obtained in step 525.

In step 535, setup 205 invokes pointer controller 212-AD of agent device 202C, wherein pointer controller 212-AD receives the pointer movement information from operator device 203. The pointer movement information (i.e., the data received by agent device 202C) is obtained in step 525.

In step 540, setup 205 invokes image-screen mapper 215-AD of agent device 202C, wherein image-screen mapper 215-AD converts the pointer position information on the operator screen into the pointer position information on the operation target screen image. This conversion may be performed with reference to the camera image held at step 505.

In step 545, setup 205 invokes pointer controller 212-AD of agent device 202C, wherein pointer controller 212-AD sends the HID data based on the pointer movement information to operation target device 201. The HID data is created by analyzing the pointer movement information. Consequently, operations (e.g., moving a pointer, clicking an object or the like) are performed on the screen (i.e., display 250-OTD) of operation target device 201. Image-screen mapper 215-AD may perform fine adjustment of the pointer position information, which is indicative of a position of a pointer on the operation target screen image, by comparing the position on the operation target screen image and a position of a pointer on the camera image sent from image handler 213-AD.

Figure 6:
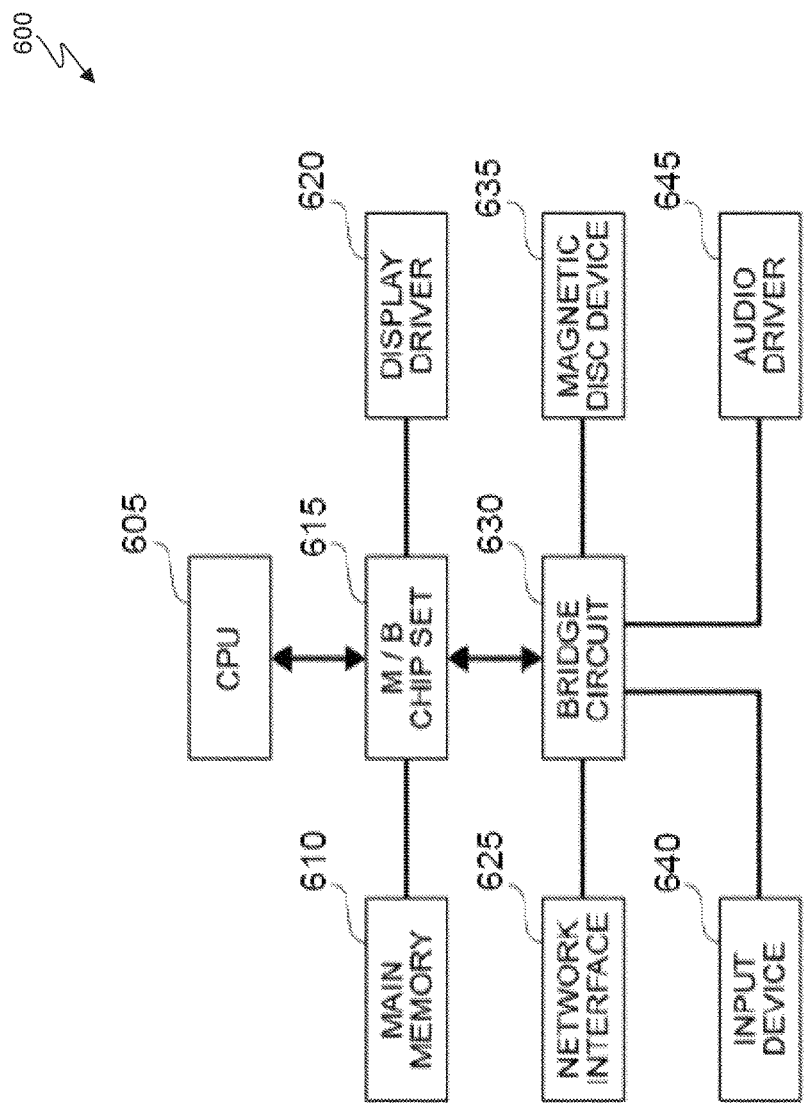
FIG. 6 is an example of a hardware configuration of the remote devices within the remote computing system, in accordance with an embodiment of the present invention.

FIG. 6 is an example of a hardware configuration of the remote devices within the remote computing system, in accordance with an embodiment of the present invention.

The remote devices within the remote computing system are: (i) agent device 202A and operator device 203 in the first remote computing system; (ii) agent device 202B and operator device 203 in the second remote computing system; and (iii) agent device 202C and operator device 203 in the third remote computing system. Agent device 202A, agent device 202B, agent device 202C, and operator device 203 have the same hardware configuration, which are described in computer hardware configuration environment 600.

Computer hardware configuration environment 600 is an example of a hardware configuration of a remote device within a remote computing system. As shown in FIG. 6, computer hardware configuration environment 600 may include a central processing unit (CPU) 605 serving as one example of a processor; main memory 610 connected to the CPU 605 via motherboard (M/B) chip set 615 and serving as one example of a memory device; and display driver 620 connected to CPU 605 via the same unit of M/B chip set 615. Network interface 625, magnetic disk device 635, audio driver 645, and input device 640 are also connected to M/B chip set 615 via bridge circuit 630.

In FIG. 6, the various configurational elements are connected by buses (i.e., communication system which transfer data between components inside a computer, or between computers). For example, buses connect CPU 605 with M/B chip set 615; and M/B chip set 615 with main memory 610. Also, M/B chip set 615 and display driver 620 may be connected via an accelerated graphics port (AGP). However, when display driver 620 includes a PCI express-compatible video card, M/B chip set 615 and the video card are connected via a PCI express (PCIe) bus. Also, when network interface 625 is connected to bridge circuit 630, a PCI Express may be used for the connection. For connecting magnetic disk device 635 to bridge circuit 630, a serial AT attachment (ATA), a parallel-transmission ATA, or peripheral components interconnect (PCI) may be used. For connecting input device 640 to bridge circuit 630, a universal serial bus (USB) may be used.

Figure 7:
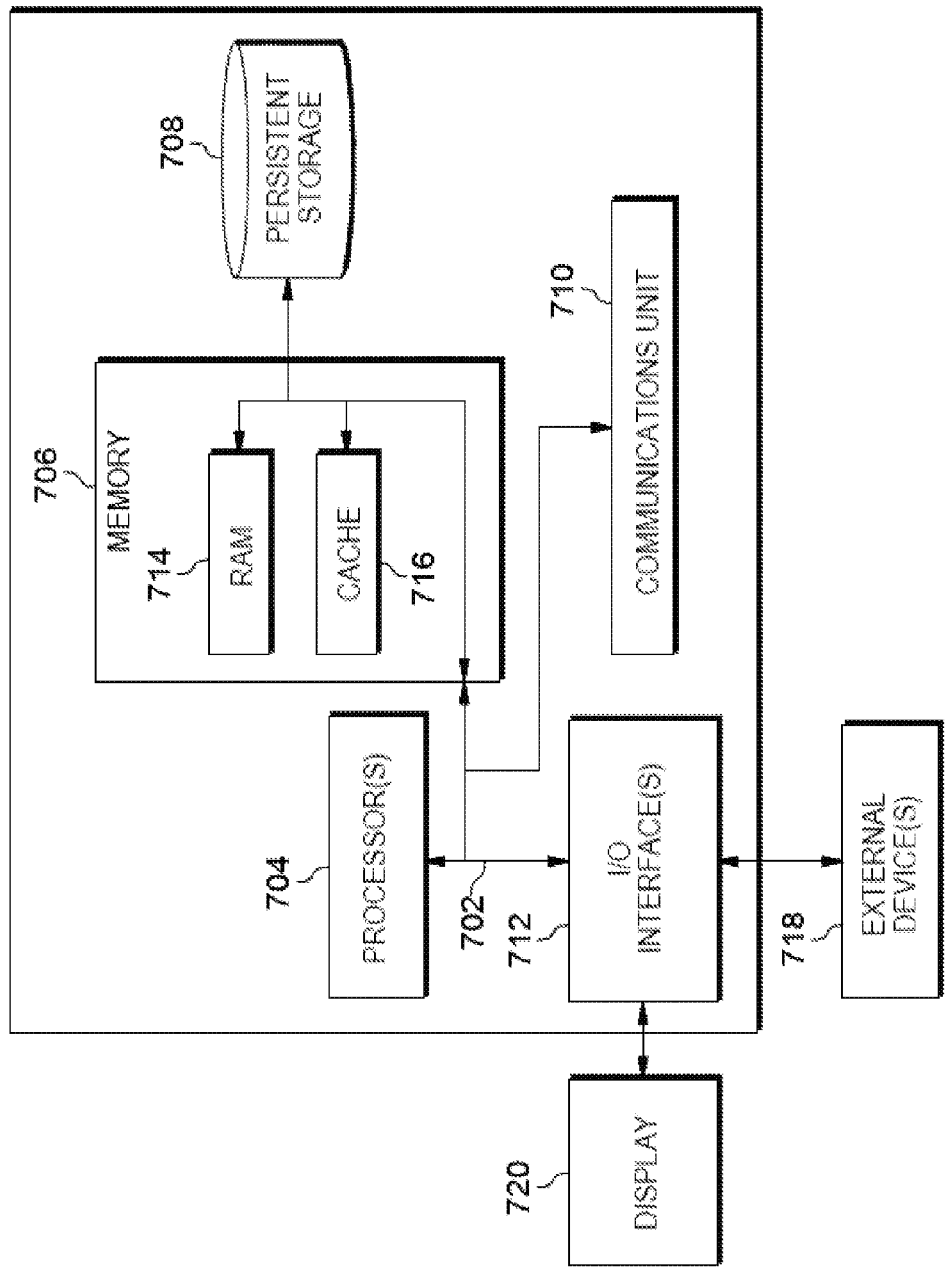
FIG. 7 is a block diagram of internal and external components of a computing device, in accordance with an embodiment of the present invention.

FIG. 7 depicts a block diagram of components of a computing device, generally designated 700, in accordance with an illustrative embodiment of the present invention. It should be appreciated that FIG. 7 provides only an illustration of one implementation and does not imply any limitations with regard to the environments in which different embodiments may be implemented. Many modifications to the depicted environment may be made.

Computing device 700 includes communications fabric 702, which provides communications between computer processor(s) 704, memory 706, persistent storage 708, communications unit 710, and input/output (I/O) interface(s) 712. Communications fabric 702 can be implemented with any architecture designed for passing data and/or control information between processors (such as microprocessors, communications and network processors, etc.), system memory, peripheral devices, and any other hardware components within a system. For example, communications fabric 702 can be implemented with one or more buses.

Memory 706 and persistent storage 708 are computer readable storage media. In this embodiment, memory 706 includes random access memory (RAM) 714 and cache memory 716. In general, memory 706 can include any suitable volatile or non-volatile computer readable storage media.

Program instructions and data used to practice embodiments of the present invention may be stored in persistent storage 708 for execution and/or access by one or more of the respective computer processors 704 via one or more memories of memory 706. In this embodiment, persistent storage 708 includes a magnetic hard disk drive. Alternatively, or in addition to a magnetic hard disk drive, persistent storage 708 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 708 may also be removable. For example, a removable hard drive may be used for persistent storage 708. Other examples include optical and magnetic disks, thumb drives, and smart cards that are inserted into a drive for transfer onto another computer readable storage medium that is also part of persistent storage 708.

Communications unit 710, in these examples, provides for communications with other data processing systems or devices. In these examples, communications unit 710 includes one or more network interface cards. Communications unit 710 may provide communications through the use of either or both physical and wireless communications links. Program instructions and data used to practice embodiments of the present invention may be downloaded to persistent storage 708 through communications unit 710.

I/O interface(s) 712 allows for input and output of data with other devices that may be connected to computing device 700. For example, I/O interface 712 may provide a connection to external devices 718 such as a keyboard, keypad, a touch screen, and/or some other suitable input device. External devices 718 can also include portable computer readable storage media such as, for example, thumb drives, portable optical or magnetic disks, and memory cards. Software and data used to practice embodiments of the present invention, e.g., software and data, can be stored on such portable computer readable storage media and can be loaded onto persistent storage 708 via I/O interface(s) 712. I/O interface(s) 712 also connect to a display 720.

Display 720 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience and thus, the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for remotely operating a target device, comprising:
    obtaining, by one or more processors, a camera image in a first device, wherein the camera image from an image handler comprises a target screen image and a position of a pointer on the target screen, wherein the target screen image is an image of a screen of the target device;
    adjusting, by one or more processors, the position displayed in an image screen mapper by analyzing the position of the pointer relative to the target screen image from the image handler;
    determining whether the first device is authorized to interact with the target device;
    transmitting, by one or more processors, at least a portion of the camera image from the first device to a second device responsive to determining that the first device is authorized to interact with the target device, wherein the portion of the camera image includes at least the target screen image;
    displaying, by one or more processors, at least the portion of the camera image on a screen of the second device;
    enabling, by one or more processors, a user to interact with the portion of the camera image to provide operational information via the second device while the first device displays at least the portion of the camera image, wherein the operational information is indicative of an operation being performed on the screen of the second device;
    transmitting, by one or more processors, the operational information from the second device to the first device; and
    inputting, by one or more processors, human interface device data from the first device to the target device, wherein the human interface device data is based on the operational information.

2. The method of claim 1, wherein transmitting at least the portion of the camera image, further comprises:
    capturing, by one or more processors, a portion outside of the target screen image, which is included in the portion of the camera image.

3. The method of claim 1, wherein obtaining the operational information, comprises:
    capturing, by one or more processors, a first set of information, wherein the first set of information is indicative of a movement direction of a pointer on the screen of the second device; and
    capturing, by one or more processors, a second set of information, wherein the second set of information is indicative of an amount of movement by the pointer on the screen of the second device.

4. The method of claim 3, further comprises:
    inputting, by one or more processors, the first set of information and the second set of information into human interface device data.

5. The method of claim 1, wherein obtaining the operational information, comprises:
    capturing, by one or more processors, a third set of information, wherein the third set of information is indicative of a position of a pointer on the target screen image of the second device; and a fourth set of information, wherein the fourth set of information is indicative of the position of the pointer on the target screen image corresponding to the pointer on the screen of a second device.

6. The method of claim 5, further comprises:
    inputting, by one or more processors, the third set of information into human interface device data.

7. The method of claim 1, further comprises:
    inputting, by one or more processors, the adjusted position in the image screen mapper the fourth set of information into human interface device data.

\* \* \* \* \*